United States Patent
Burge et al.

[11] 3,782,116
[45] Jan. 1, 1974

[54] FOAM COOLING AND ACOUSTIC DAMPING FOR INTERNAL COMBUSTION ENGINES

[75] Inventors: Harland L. Burge, Tarzana; Newell C. Rodewald, Manhattan Beach, both of Calif.

[73] Assignee: TRW Inc., Redondo Beach, Calif.

[22] Filed: Mar. 10, 1971

[21] Appl. No.: 122,858

[52] U.S. Cl............... 60/258, 60/39.02, 60/39.5, 50/264, 60/265, 60/310, 181/33 HC, 239/265.17
[51] Int. Cl. ........ F02k 1/26, F02k 9/02, F01n 1/00
[58] Field of Search............. 60/265, 258, 264, 60/204, 39.02, 39.05, 39.5, 310, 317; 239/265.17, 127.3; 181/33 B, 33 HC; 55/87, DIG. 30

[56] References Cited
UNITED STATES PATENTS

| | | | |
|---|---|---|---|
| 1,144,193 | 6/1915 | Haas | 55/87 |
| 3,303,654 | 2/1967 | Bringer | 60/265 |
| 3,358,456 | 12/1967 | Lehrer | 60/39.46 |
| 3,365,889 | 1/1968 | Cooper | 60/257 |
| 3,383,854 | 5/1968 | White | 60/310 |
| 3,534,555 | 10/1970 | Ayvazian | 60/204 |

*Primary Examiner*—Douglas Hart
*Attorney*—Daniel T. Anderson, William B. Leach and Donald W. Graves

[57] ABSTRACT

There is disclosed a method and apparatus for providing thermal protection and acoustic damping in an internal combustion engine by means of injecting a liquid base foam into the gas boundary zone of the combustion gases. A foaming agent, a liquid, and a gas are processed to produce a high expansion foam solution. In one embodiment the foam is generated external to the combustion chamber and is supplied to a distribution manifold located at the injector end of a rocket motor. The foam is then distributed through a plurality of orifices which direct the foam along the walls of the combustion zone and thus into the boundary layer of the combustion gases. The foam may be injected at any point along the gas boundary zone including the free jet boundary layer immediately downstream of the exhaust exit.

7 Claims, 4 Drawing Figures

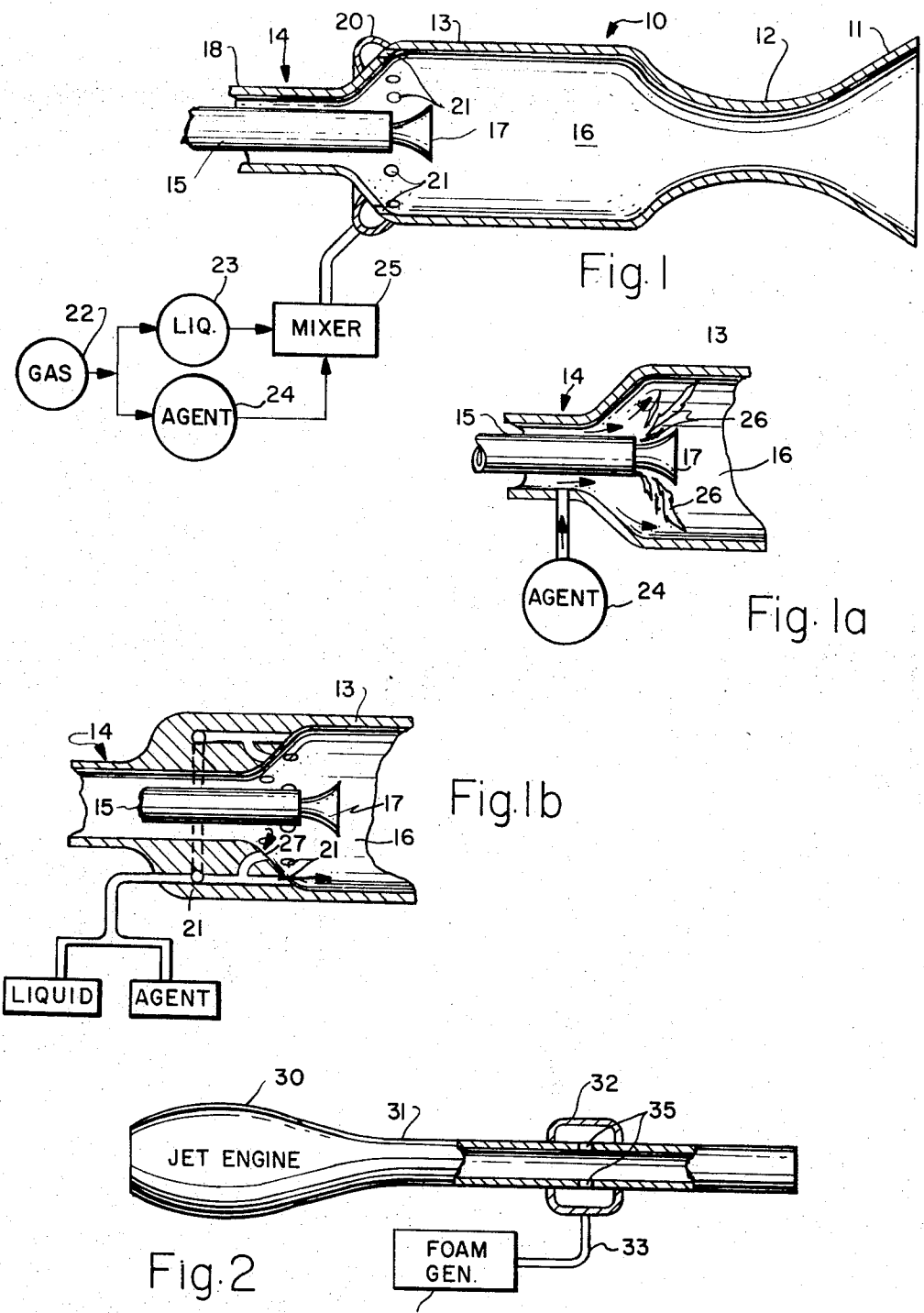

FOAM COOLING AND ACOUSTIC DAMPING FOR INTERNAL COMBUSTION ENGINES

BACKGROUND OF THE INVENTION

This invention relates both to the cooling of internal combustion engines and to the acoustic damping of noise generated by the combustion gases.

The use of a liquid film to protect the walls of a rocket engine began with the effort on the German V-2 rocket engine. Since that time there has been a need for improved cooling techniques brought about by the use of high energy high temperature propellants, high chamber pressures and the need to lengthen engine life. Cooling efficiencies greater than 30 percent have seldom been achieved in controlled laboratory heat transfer experiments because the liquid film is subjected to severe shear stress which results in wave stripping at conditions typically found in a rocket motor. Wave stripping is the buildup of crests in the film resulting in a breakdown of the cooling properties. Liquid film cooling for rocket motors is generally recognized as an inefficient method of protecting the combustion chamber wall. Severe operating conditions are found in the combustion zone of a rocket motor and therefore thermal protection becomes of utmost importance. However, the method and apparatus disclosed herein may readily be applied to other forms of internal combustion engines.

The jet engine is a prime example of an internal combustion engine which requires some form of cooling either in the combustion zone or exhaust duct or both. The technique of cooling a rocket motor discussed herein are applicable to jet engines and the exhaust of reciprocating piston engines.

In addition to the thermal problem associated with the combustion there is also the problem of noise generated by the combustion process and sometimes added to by moving machinery associated therewith. One focal point for noise abatement recently has been that of the aviation industry. Increasing aviation requirements for higher powered engines have resulted in an increased aero-dynamic related noise problem. Excellant progress has been made in the theoretical understanding of the source of such noise. Attempts to alleviate the noise problem have included the use of multiple nozzles, spike nozzles, slit nozzles and internal acoustically treated ducts. An example of another approach to the problem is that of the bypass fan engine wherein secondary air is injected to effect mixing shear layers. Other means of alleviating jet noise have been suggested including the injection of water and solid particles into the jet exhausts. The results have not indicated sufficient noise reduction for the amount of material injected.

An example of the injection of fluids into the combustion gases of jet engines may be found in the U. S. Pat. to Wisniowski, No. 2,927,423, issued 1960. A more recent attempt of solving the noise problem is shown in the U. S. Pat. to O'Brien, No. 3,442,350, issued 1969 wherein a manifold assembly extends radially around and spaced from the exhaust exit of an aircraft engine. Air is mixed with soapy water to produce an annular sheet of bubbles which surrounds the exhaust gases. The bubble sheet is initially separated from the exhaust gases by the ingestion of ambient air between the manifold and exhaust duct. While O'Brien discloses a substantial contribution to the art of noise suppression, the Applicants believe that substantial improvements in noise abatement may be accomplished by the principles of the invention disclosed herein.

It is accordingly an object of the present invention to provide a method and mechanism for the thermal protection and acoustic damping of noise characteristics associated with combustion products in internal combustion engines which is not subject to the problems and shortcomings of the prior art.

It is another object of the present invention to provide a method and mechanism for providing film cooling of thermal characteristics and acoustic damping of noise characteristics associated with combustion products wherein a liquid base foam is injected into the gas boundary zone of the combustion products.

SUMMARY OF THE INVENTION

The invention includes both method and apparatus for providing film cooling of the walls in the combustion zone of an internal combustion engine as well as providing acoustic damping of the noise associated with the combustion process. The Applicants have discovered that various liquid base foams have excellant thermal insulating and acoustic damping properties when such foams are injected into the gas boundary zone of the combustion gases, either in the boundary layer at or near the combustion wall or in the free jet boundary layer. The apparatus includes a foam generator of either the chemical or mechanical type for generating a foam solution from one of several suitable compositions. The invention further invisions means for injecting the foam solution directly into the gas boundary zone of the combustion gases and may include a manifold and a plurality of passageways terminating substantially in the gas boundary zone. The manifold and passageways or orifices may be located at any one of several axial positions along the flow of the combustion gases, either within the combustion zone of the engines or within the exhaust duct.

DESCRIPTION OF THE DRAWINGS

FIG. 1 is a diagram in partial cross-section showing a rocket motor into which there is injected, near the injector face, a layer of foam supplied thereto from a foam generator in accordance with the principles of the present invention;

FIG. 1a is a diagram in partial cross-section showing an alternative embodiment of means for generating and injecting a foam solution in a rocket motor;

FIG. 1b is another embodiment of the foam solution generation and injection of FIGS. 1 and 1a;

FIG. 2 is a diagram in partial cross-section showing an alternative embodiment in accordance with the present invention wherein foam is injected into the exhaust ducts of an engine.

DESCRIPTION OF THE PREFERRED EMBODIMENTS

Turning now to the drawings, and with particular reference to FIG. 1, there is generally shown a rocket motor 10 having a nozzle section 11, a throat section 12, a combustion section 13 and an injector assembly 14. The injector assembly 14 includes a central distribution tube 15 to which fuel may be supplied and carried into the combustion zone 16 where it is distributed radially outwardly by a deflector element 17. The distribution tube 15 and the outer wall 18 of the injector assembly 14 form an annular passageway to which an oxidizer may be supplied and carried into the combustion zone 16 where it mixes with the fuel for combustion. An injector assembly of this type is generally referred to as a coaxial assembly. The rocket motor as described is an example of one internal combustion engine with which the invention herein may be practiced.

FIG. 1 further shows injection means which includes a distribution manifold 20 which is in communication with the combustion zone 16 by way of a plurality of orifices 21. Also, shown in FIG. 1 is a foam generator which includes a gas supply 22. The gas may be supplied to a liquid supply tank 23 and a foaming agent supply tank 24 each of which is connected to a mixing chamber 25 wherein the gas, liquid, and foaming agent are combined to form a foam solution to be supplied to the distribution manifold 20 and then forced under pressure through the orifices 21. The foam will be carried along the walls by the combustion gases and is thereby effectively introduced into the gas boundary zone of the combustion gases. As used herein the term "gas boundary zone" is used to refer both to the boundary layer of the gas as it exists between the gas and a fixed boundary such as the walls of the rocket motor and also to the free jet boundary of the exhaust gases. The injection flow rate of the foam solution is adjusted so as to provide a continuous film of the foam solution on the walls of the rocket motor. As this discussion will develop, the advantage of the foam solution over the pure liquid as a film coolant is that the foam solution has a substantially increased viscosity which resists shearing action by the combustion gases and it has a highly increased surface tension over that of pure liquid which resists gas wave interaction stripping.

Experiments conducted with a 100 lb. -thrust rocket motor effectively showed that when foam was placed upon the combustion chamber wall at the injector end, as shown in FIG. 1, the foam was found to carry through the subsonic, transonic, and supersonic parts of the nozzle. It was also observed that the amount of fuel devoted to film cooling was substantially reduced. In rocket motors which introduce raw fuel along the combustion walls to serve as a film coolant, some 30 to 40 percent by weight of fuel is normally required to effectively film cool the engine. The aforementioned experiments indicate that 3 to 5 percent by weight of fuel was adequate as the liquid utilized in the foam generator. One of the phenomena associated with rocket motors is that of combustion roughness caused by combustion pressure perturbations or pressure waves. The combustion roughness is readily evident by changes in the noise level associated with the operation of the rocket motor. In the foregoing experiments, the rocket motor was operated both with and without foam coolant. With the foam on the walls of the rocket motor there was approximately a 40 percent reduction in the peak to peak roughness variations, thus indicating that the foam served well as an acoustic iner.

FIG. 1a is an alternative embodiment of the foregoing concept and sets forth another of a variety of ways in which the foam solution may be generated. In FIG. 1a the foam is generated through the use of the coaxial injector with the foaming agent being introduced directly into the main fuel supply. In this embodiment of the invention, the fuel plus foaming agent flows into the combustion zone where it interacts with the oxidizer flowinG through the distribution tube 15 of the injector assembly and resulting in a flame front 26. The propellant flow rates are adjusted such that a part of the foaming agent and fuel combination will pass over the primary reaction zone or flame 26 and to the wall of the combustion zone where the fuel and foaming agent combination interact with relatively cool gases. These cool gases are entrapped in the liquid to generate a foam solution which then flows down and along the combustion zone wall.

FIG. 1b shows yet another variation of the basic concept. In this variation a foaming agent and a liquid, which may be rocket fuel, is introduced through a plurality of orifices 21. Associated with each of the plurality of orifices 21 is an aspirating tube or passage 27 through which relatively cool gases are aspirated into the orifices 21 where the gases are entrapped in the flowing liquid and the foaming agent serves to stabilize the foam solution. As in the embodiment of FIG. 1, the foam solution is injected along the walls of the combustion chamber 16. All of these embodiments utilize the basic conept of generating a foam solution which is then injected into the gas boundary zone of the combustion gases to provide an effective means of cooling the walls of the rocket engine and for providing an acoustic absorber to eliminate acoustical instabilities associated with combustion. The foregoing concepts are not limited to applications associated with rocket motors and, in fact, are applicable to all forms of internal combustion engines any of which may be substituted for the rocket engine shown in the figures.

Turning now to FIG. 2 there is shown an alternative embodiment constructed in accordance with the principles of the present invention and shown in conjunction with a jet engine. The jet engine 30 is of common design well known in the art and as assocated therewith an exhaust duct or section 31 for directing the exhaust gases associated with the operation of the jet engine. Associated with the exhaust duct 31 is a distribution manifold 32 which is connected by a supply conduit 33 to a foam generator 34. The foam generator may include the various components described in FIG. 1.

A foam solution generated by the foam generator is supplied through conduit 33 to the manifold 32 and through a plurality of orifices 35. A foam solution so supplied will be effectively introduced or injected into the gas boundary zone of the exhaust gases as they traverse the exhaust duct 31. A foam solution injected in the manner as shown in FIG. 2 provides an effective means for cooling the exhaust duct as well as providing acoustic damping of the noise associated with the operation of the jet engine. It may be readily observed that the jet engine 30 may have substituted therefore a reciprocating piston engine or any other form of internal combustion engine.

Foam Technology

The science of generating foams dates back many years. The primary application of foams in recent years has been in fire fighting and the majority of literature sources relate to this application. The science of foam generation involves the understanding of the interplay between surface chemistry and the mechanical forces present within the foam tending to hold it together or tending to break it down. The type of foaming agent, the concentration of agent, the expansion ratio of the foam, the ultimate shear stress, and the gas constituent are all variables in the production of foam and for practical purposes must be empirically determined to specific applications.

Studies of the deformation and the flow typical of foam solutions shows that the bulk viscosity of the foam is greatly increased over that of liquids. The effective thermal conductance of the foam is reduced from that of the parent liquid by virtue of entrapped low conductivity gases thus forming an insulating blanket. The effective surface tension of the foam is increased over that of the liquid by virtue of the entrapped bubble geometries and mechanical interlocking. The density of the foam is much lower than that of the constituent liquid. These various properties of foam lead to a greatly enhanced stability of the foam and resistance to free stream gas stripping. Because of these favorable qualities the quantity of material required for internal heat transfer protection can be reduced considerably below that required for pure liquid film cooling in almost direct ratio to the densities. A nominal 30 to 40 percent weight of fuel is normally required in small rocket engines to effectively liquid film cool. With foam only a 3 to 5 percent by weight of fuel is necessary to provide cooling.

With regard to acoustic damping it is believed that energy dissipation is primarly twofold. First, on the surface of the foam the breakup of the foam enclosed gaseous bubbles involves a certain amount of volumetric change work and surface tension extension work. Secondly, and because the material is compresible and is viscously intertwined, additional energy is dissipated through viscous dissipation. It is known that a gas bubble in the foam tends to take on the shape of a sphere and work must be done to increase its surface which resists extension and has surface energy. Experimental results have also shown that a resonating bubble is characterized by violent activity in a liquid through which intense sound wave is passing. Thus, it can be deducted that a resonating bubble plays a dominating role in determining acoustic damping characteristics. As a general guide to the selection of foams, it may be noted that the expansion ratio of the foam should be selected such that the average bubble size will resonate at the predominate frequency of interest. Also, the effective viscosities should be maximized and the foam should be placed in proximity of the generating noise source. The predominate type of foaming agent that has evolved in a protein hydrolysate made from such materials as hoof and horn meal, soybeans, and animal blood. Other types of foaming agents have been developed and marketed such as a polymeric film produced by agitating with air a solution of water and a linear low molecular weight polymer which is further reacted by a catalyst in the presence of air. This foam was specifically developed to combat fires. Another important foaming agent is a synthetic detergent type, which when added to water, is capable of forming a high expansion foam of approximately 1,000 parts of air by volume to one part of 'iquid.

The concentration of the foaming agent affects the stability and heat resistance of foam. The basic effect of the foaming agent is to reduce the surface tension of the liquid. The ratio of the volume of foam to the volume Of liquid is another fundamental parameter and is referred to as the expansion factor. Physical properties such as thermal conductivity and foam viscosity vary widely with the expansion factor. The size of the gas bubble for a given expansion ratio governs the ultimate shear stress which is a measure of the foam resistance te flow under static conditions. The heat resistance of a foam tends to increase markedly with an increase in the ultimate shear stresS. In tests conducted by the Applicants, it was determined that for purposes of heat resistance an expansion ratio of approximately 16 to 1 seemed to be optimum.

Conclusions

Both heat transfer and noise abatement studies have shown positive results with the use of foam injection. Internal acoustic absorption as well as external absorption appear practical ways of providing acoustic damping. In the jet engine, the application possibilities are numerous. With respect to compressor whine, internal surface application of foam seems practical. The foam generator may be automatically controlled so as to provide silencing of the jet engine only during takeoff, landing and low altitude operation near residential areas thereby reducing the quantity of liquid that would be needed to be carried on board the aircraft for foam generation purposes. As described herein the Applicants have provided both a simple method and apparatus for providing thermal protection and acoustic damping of noise characteristics associated with the combination product in internal combustion engines.

What is claimed:

1. In combination with an internal combustion engine of the type having a combination chamber therein, apparatus comprising:
    a. a foam generator for producing a foam solution; and
    b. injection means in communication with said foam generator and the gas boundary zone associated with a wall of the internal combustion engine for continuously inserting the foam solution directly into the gas boundary zone of the combustion gases during ccmbustion.

2. The apparatus of claim 1 wherein the internal combustion engine is a rocket motor of the type having an injector assembly forming a portion of the combustion chamber walls and whereinsaid injection means comprises:
    a. a manifold substantialy encompassing the injector portion of the rocket motor and having an inlet connected to the outlet of the foam generator; and
    b. a plurality of orifices distributed around the periphery of the injector and each in communication with said manifold and each orifice aligned so that foam injected therethrough will direct the foam along the walls of the rocket motor combustion chamber thereby injecting the foam into the boundary layer of the combustion gases.

3. The apparatus of claim 1 wherein the internal combustion engine is a rocket motor of the type having means for supplying rocket motor fuel to the combustion chamber and wherein said foam generator comPrises:
    means for continuously injecting a foaming agent intO the rocket motor fuel supply at a predetermined rate such that a portion of the fuel and foaming agent mixture will combine with combustion gases to form a foam solution along the walls of the combustion chamber during combustion.

4. The apparatus of claim 1 wherein the internal combustion engine is a rocket motor of the type having an injector assembly forming a portion of the combustion chamber walls and wherein said injection means comprises:

a plurality of orifices located proximate the combustion chamber wall and the injector assembly, and wherein said foam generator comprises:

means for supplying a liquid to each orifice;

means for supplying a foaming agent to each orifice; and at least one aspirating tube in communication between said orifices and an injector face location providing a source of relatively cool combustion gases whereby a liquid and a foaming agent may be combined with combustion gases to form a foam solution that flows through said orifices and into the gas boundary zone.

5. The apparatus of claim 1 wherein the internal combustion engine is a jet engine having an exhaust duct and wherein said injection means comprises:

a conduit connected between and in communication with said foam generator and the engine exhaust duct whereby foam may be injected into the boundary zone of the exhaust duct gases.

6. The apparatus of claim 5 wherein said injection means further comprises:

a. a manifold encompassing the engine exhaust duct and having said conduit connected thereto; and b. a plurality of orifices in the wall of the engine exhaust duct each being in communication with said manifold whereby foam may be injected into the boundary zone of the exhaust gases.

7. A method of providing cooling and sound absorbing properties for combustion gases comprising the steps of:

a. providing an internal combustion engine of the type having a combustion chamber therein;

b. generating a liquid base foam solution; and c. continuously injecting the foam solution directly into the gas boundary zone of the combustion chamber during combustion.

* * * * *